United States Patent [19]

Lemle

[11] Patent Number: 4,878,684
[45] Date of Patent: Nov. 7, 1989

[54] RECUMBENT BICYCLE

[76] Inventor: Eugene W. Lemle, 3891 Rte. 295, Swanton, Ohio 43558

[21] Appl. No.: 139,913

[22] Filed: Dec. 31, 1987

[51] Int. Cl.$^4$ ................................................ B62K 3/14
[52] U.S. Cl. ................................................ 280/288.1
[58] Field of Search ............ 280/281 LP, 282, 281 R, 280/242 R, 244, 220

[56] References Cited

U.S. PATENT DOCUMENTS

| | | | |
|---|---|---|---|
| 4,283,070 | 8/1981 | Forrestall et al. | 280/220 X |
| 4,333,664 | 6/1982 | Turner et al. | 280/281 LP X |
| 4,431,203 | 2/1984 | DeMoss | 280/281 LP X |
| 4,527,811 | 7/1985 | De Moss | 280/281 LP |

FOREIGN PATENT DOCUMENTS

| | | | |
|---|---|---|---|
| 103479 | 3/1938 | Australia | 280/281 LP |
| 3540976 | 5/1987 | Fed. Rep. of Germany | 280/282 |

*Primary Examiner*—Charles A. Marmor
*Assistant Examiner*—Mitchell J. Hill
*Attorney, Agent, or Firm*—Willian Brinks Olds Hofer Gilson & Lione

[57] ABSTRACT

A recumbent cycle whose seat can be quickly repositioned on the frame to provide for adjustable spacing between the seat and the pedal assembly. The seat has a rod which extends rearwardly from the backseat portion thereof at a location near the upper portion of the back seat and the rod is slidably received in a tubular portion of the frame. in one embodiment, the tubular portion of the frame has an aperture extending therethrough, and the rod portion of the seat has a spaced apart series of apertures extending therethrough, any one of which can be brought into alignment with the aperture in the tubular portion. A hand-removable U-shaped clip is provided to secure the seat in a predetermined position relative to the frame by inserting a leg of the clip through the aperture in the tubular portion and an aligned aperture in the rod. In another embodiment, the tubular portion is provided with a hand operated, quick release latching mechanism to secure the rod of the seat in a desired position relative to the tubular portion of the frame. The seat is provided with a pair of spaced apart, downwardly facing C-shaped brackets which partly surround and engage a sleeve that is affixed to a horizontal support bar portion of the frame and which are slideable along the horizontal support bar portion.

25 Claims, 1 Drawing Sheet

RECUMBENT BICYCLE

BACKGROUND OF THE INVENTION

2. Field of the Invention

This invention relates to a recumbent cycle, such as a bicycle, tricycle, motor cycle or the like, and has particular utility in the form of a recumbent bicycle. More particularly, this invention relates to a recumbent cycle with a seat whose location can be rapidly adjusted to provide for an adjustable spacing between the seat and a pedal portion or other foot supporting portion of the cycle.

2. Description of the Prior Art

Recumbent bicycles are known in the prior art and various embodiments of bicycles of this type are disclosed in U.S. Pat. Nos. 4,527,811 (L. A. DeMoss), 4,283,070 (R. J. Forrestall et al.), and 4,431,203 (L. A. DeMoss). As is clear from the prior art, it is known that it is desirable to construct a recumbent bicycle with a pedal crank whose position along the frame of the bicycle is fixed, to avoid the need for a mechanism to change the length of the drive chain that is trained around a drive sprocket which is positioned at the pedal crank, and a driven sprocket which is positioned at the rear wheel of the bicycle, and with a seat whose position along the frame is adjustable to provide for adjustable spacing between the seat and the pedal crank to thereby accommodate riders of varying height. This is especially important in a recumbent bicycle which is used in a rental operation, since it is necessary to make the seat adjustment in such a bicycle quite frequently and very quickly. However, recumbent bicycles as illustrated in the foregoing references have seats whose positions are difficult and time-consuming to adjust, for example, in the case of the aforesaid U.S. Pat. No. 4,527,811, also involving the adjustment in the position of a handle bar steering control mechanism which is operatively associated with a front wheel supporting fork by a pair of steering cables whose length must be adjusted with the adjustment of the positions of the seat and the steering control mechanism. Further, the back of the seat in a recumbent bicycle receives rather substantial loads, and it is desirable that the upper portion of the backrest of the seat be supported against undue deflection under such loads, regardless of the position of the seat. Prior art adjustable seat recumbent bicycles have not been very satisfactory in this feature, however.

SUMMARY OF THE INVENTION

Accordingly, it is an object of the present invention to provide an improved recumbent cycle. More particularly, it is an object of the present invention to provide an improved recumbent bicycle. Even more particularly, it is an object of the present invention to provide a recumbent cycle with a seat whose position on the frame of such cycle may be rapidly adjusted. Even more particularly yet, it is an object of the present invention to provide a recumbent cycle with a seat which is supported near the top of the backrest portion thereof against excessive deflection under load and whose position on the frame of such cycle may be rapidly adjusted.

For a further understanding of the present invention and the objects thereof, attention is directed to the drawing and the following brief description thereof, to the detailed description of the preferred embodiment and to the appended claims.

DETAILED DESCRIPTION OF THE PREFERRED EMBODIMENT

Figure 1:
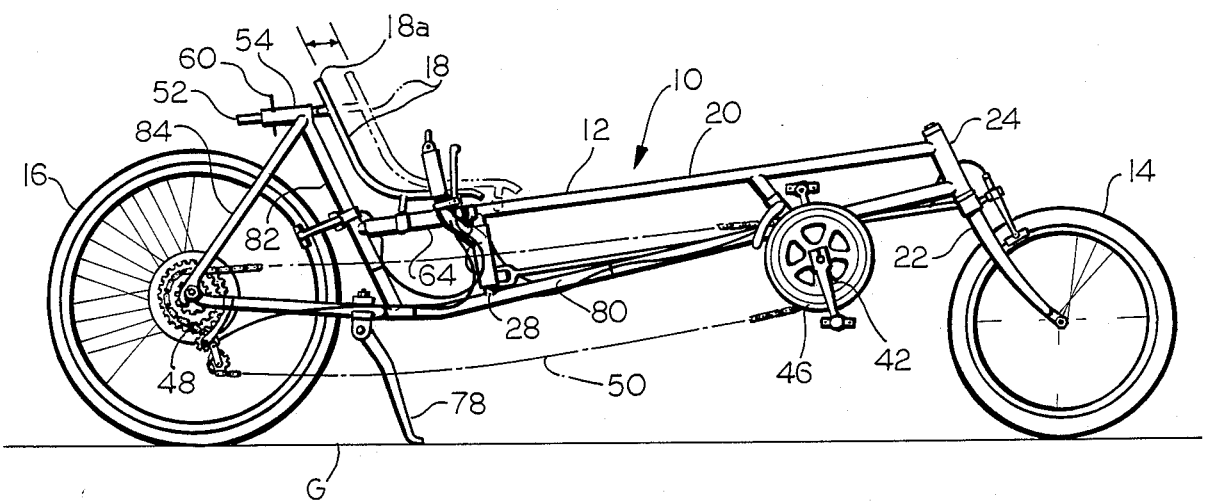
FIG. 1 is an elevational view of the preferred embodiment of a recumbent bicycle according to the present invention with certain portions of such bicycle being omitted for the sake of clarity.

A recumbent bicycle according to the preferred embodiment of the present invention is identified generally by reference numeral 10, and includes a generally horizontally extending bicycle frame 12 which is supported for motion on a front wheel 14 and a rear wheel 16. The recumbent bicycle 10 is shown in FIG. 1 in an upright, rest position on the ground G, and further includes a seat 18, only the frame portion of which is illustrated in the drawing, it being understood that webbing material, (not shown) will normally be attached to such frame portion. The seat 18 is supported by a generally horizontally extending support bar portion 20 of the frame 12, as will be hereinafter described more fully, and the position of the seat 18 on the support bar 20, between the front wheel 14 and the rear wheel 16, is adjustable, as will also be hereinafter described more fully.

The front wheel 14 is rotatingly engaged between the arms of a generally vertically extending fork member 22, which includes a centrally positioned stem portion that is journalled for rotation in a tubular head portion 24 of the frame 12. Steering of the bicycle 10 is effected by the oscillation of the stem portion of the fork member 22 in the head portion 24, and this is remotely controlled by a handle bar steering control mechanism 26 which includes a centrally positioned stem portion that is rotatably mounted with respect to a generally vertically extending portion 28 of the frame 12. The steering control mechanism 26 is provided with an outwardly extending link 30, the fork member 22 is provided with an outwardly extending link 32, and the links 30 and 32 are connected by a tubular connecting rod 34. The front wheel 14 is provided with a caliper brake 36 which is actuated by a lever 38 at one of the extremities of the handle bar steering control mechanism 26, with a flexible cable 40 being provided to transmit force from the lever 38 to the caliper brake 36. As mentioned, the connecting rod 34 is tubular in configuration, and the flexible cable 40 is run through the connecting rod 34 for most of its length, to enhance the clean cut appearance of the bicycle 10 and to safeguard the flexible cable 40 from damage by external impacts, to the maximum extent. Preferably, a similar braking mechanism, which is actuated by a lever at the other of the extremities of the handle bar steering control mechanism, is provided to apply braking forces to the rear wheel 16.

The bicycle 10 is also provided with a pedal assembly portion 42 which is journalled for rotation in a pedal crank portion 44 of the frame 12 and which is provided with a drive sprocket 46. The rear wheel 16 of the bicycle 10 is provided with a co-axial driven sprocket 48 and torque which is imparted to the pedal assembly 42 is transmitted to the rear wheel 16 by a roller chain 50 which is trained around the drive sprocket 46 and the driven sprocket 48. As illustrated, the sprocket and chain drive of the bicycle 10 is an otherwise conventional multiple speed drive of the derailleur type.

The frame of the seat 18 includes a generally horizontally extending rod member 52 which may be tubular and which extends rearwardly from a generally upright backrest portion 18a of the seat 18. The rod member 52 is slideably received in a tubular portion 54 of the frame 12, and it is provided with a series of holes 56 extending therethrough, and the tubular portion 54 of the frame 12 has a hole 58 extending therethrough. By the proper positioning of the seat 18 on the frame 12, one or another of the holes 56 is adapted to be brought in alignment with the hole 58, and can be releasably secured in such position by a hand removable U-shaped clip 60 which has a leg portion that extends through the hole 58 and one of the holes 56. Thus, the seat 18 can be positioned at any of a multiplicity of locations along the frame 12 for optimum spacing between the seat 18 and the pedal assembly for the rider of the bicycle 10, as determined by the size of such rider, as illustrated by the solid line and dotted line outlines of the seat 18 in FIG. 1.

The seat 18 is also supported on the support bar 20 of the frame 12 by having front and rear downwardly facing C-shaped brackets 62 which are parts of the seat 18 or which are attached thereto and partially surround the upper portion support bar 20. Preferably, each bracket 62 is part cylindrical in configuration and has an opening which is smaller than the internal diameter thereof, and the portion of the support bar 20 which supports the seat 18 has an outside diameter which is less than the opening of each of C-shaped brackets 62. This serves to permit the ready disengagement of the seat 18 from the frame 12. However, to prevent such disengagement during the operation of the bicycle 10, the portion of the support bar 20 which supports the seat 18 is provided with a support sleeve 64 whose outside diameter is larger than the opening of the C-shaped brackets 62. Thus, when the seat is positioned so that the C-shaped brackets 62 engage the support sleeve 64, the seat 18 will be positively retained by the frame 12, but when the clip 60 is removed from the hole 54 and the hole 56 in which it is engaged, the seat 18 may be slid forward on the frame 12 so that the C-shaped brackets 62 clear the support 64, at which time the seat 18 can be quickly lifted from the frame 12.

The handle bar steering control mechanism 26 includes a central T-shaped tubular portion 66 and a pair of outwardly extending, generally L-shaped members 68 and 70 which terminate in upwardly extending handles 72 and 74 respectively. The ends of the members 68 and 70 which are opposite the handles 72 and 74 are releasably retained in the arms of the T-shaped tubular portion 66, which is provided with a pair of quick-release latching mechanisms 76 to permit rapid adjustment of the position of the upstanding handles 72 and 74 are relative to the seat 18, to optimize the position of the handles 72 and 74 in relationship to the seat 18 as the seat 18 is adjusted in its position relative to the pedal assembly 42. Further, the latching mechanisms 76 can be utilized to permit the rapid disassembly of the members 68 and 70 from the recumbent bicycle 10 for ease in the shipment of the bicycle. As is illustrated, the recumbent bicycle 10 is also provided with a kick stand 78 of conventional construction which is secured to a second generally horizontally extending support bar 80 of the frame 10 which is disposed below the support bar 20. Further, the frame 12 provided with an upstanding support bar 82 which extends from the support bar 80 past the support bar 20 to support the rod member 52, and a pair of spaced apart, rearwardly extending support bars 84 which extend from the tubular portion 54 to engage a split end of the support bar 80 at the location of the axis of the rear wheel 16. Thus, the rear of the frame 12 of the recumbent bicycle 10 has a rigid, generally triangularly shaped portion which is made up of the upstanding support bar 82, the rearwardly extending support bars 84 and the rear split portions of the generally horizontally extending support bar 80, and as illustrated, the shape of such triangularly shaped portion is preferably that of an equilateral triangle.

Figure 3:
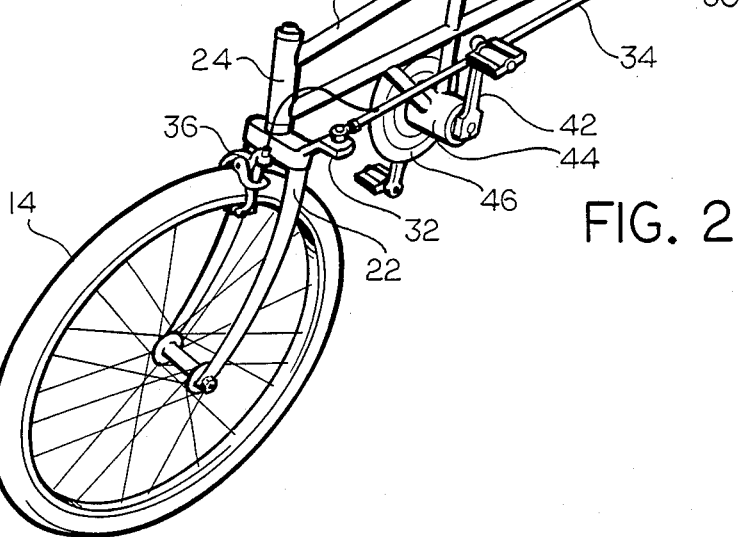
FIG. 3 is a fragmentary perspective view of a modified embodiment of a recumbent bicycle according to the present invention.
Figure 2:
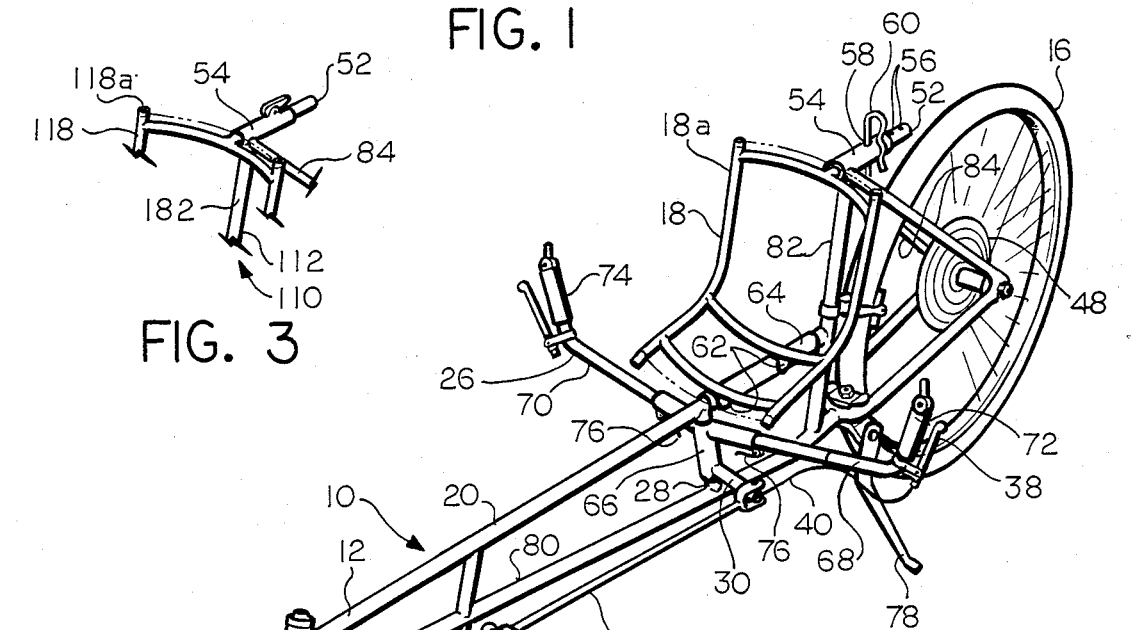
FIG. 2 is a perspective view of the recumbent bicycle of FIG. 1.

FIG. 3 illustrates a modified embodiment of a seat supporting mechanism for a recumbent bicycle 110 that is otherwise the same as the recumbent bicycle 10 of the FIGS. 1 and 2. The bicycle of FIG. 3 has a seat 118 which is provided with a generally horizonally extending rod member 152 which extends rearwardly from a generally upright backrest portion 118a of the seat 118. The rod member 152 is slidably received in a tubular portion 154 of a frame 112 of the bicycle 110, at the top of an upstanding support bar portion 182 of the frame 112. A hand operated, quick release latching mechanism 160 is provided to secure the rod member 152 of the seat 118 in position with respect to the tubular portion 154 of the frame 112, and, upon the release of the latching mechanism, to permit a rapid change in the position of the seat 118 with respect to the frame 112.

Although the best mode contemplated by the invention for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. A recumbent cycle comprising:
   front wheel means;
   rear wheel means;
   generally horizontally extending frame means extending between said front wheel means and said rear wheel means, said front wheel means being journaled in said frame means for oscillation about a generally vertically extending axis to permit steering of said recumbent cycle, said frame means comprising a generally horizontally extending support bar, a generally horizontally extending tubular member, and means extending from said support bar for supporting said tubular member;
   foot supporting means attached to said frame means;
   a seat spaced from said foot supporting means and comprising a generally horizontally extending bottom portion and a generally vertically extending backrest portion; said bottom portion being slidably supported on said generally horizontally extending support bar, said backrest portion having a generally horizontally extending rod member extending rearwardly therefrom, said rod member being slidably received in said tubular member;
   means cooperative with said rod member and said tubular member for adjusting the position of said seat on said frame means between said front wheel means and said rear wheel means to adjust the spacing between said seat and said foot supporting means;

handle bar steering control means having opposed handles which are graspable by a person in said seat, said handle bar steering control means being spaced from said front wheel means and being journaled with respect to said frame means for oscillation about a generally vertically extending axis, said handle bar steering control means further having a central T-shaped member, said opposed handles being pivotably and detachably secured to opposed ends of a head portion of said T-shaped member, each of said opposed handles extending outwardly and upwardly from said T-shaped member; and connecting rod means connecting said handle bar steering control means to said front wheel means for transmitting oscillating movement from said handle bar steering control means to said front wheel means.

2. A recumbent cycle according to claim 1 wherein said front wheel means comprises a single wheel, wherein said rear wheel means comprises a single wheel, wherein said foot supporting means comprises a rotatable pedal assembly, and further comprising sprocket and chain drive means for transmitting rotational movement from said pedal assembly to said rear wheel means.

3. A recumbent cycle according to claim 2 wherein said connecting rod means is tubular and further comprising;

brake means for applying braking force to said front wheel means comprising a caliper brake at said front wheel mean, a brake operating lever at said handle bar steering control means, and a flexible cable extending at least partly through said connecting rod means from said brake operating lever to said caliper brake.

4. A recumbent cycle according to claim 3 wherein said seat comprises downwardly facing C-shaped bracket means, said C-shaped bracket means partly surrounding said generally horizontally extending support bar and being slideable therealong.

5. A recumbent cycle according to claim 2 wherein said sprocket and chain drive means comprises a multiple speed drive of the derailer type.

6. A recumbent cycle according to claim 5 wherein said clip means comprises a hand removable, generally U-shaped clip, and wherein said portion of said clip means is a leg portion of said U-shaped clip.

7. A recumbent cycle according to claim 6 wherein said frame means further comprises a second, generally horizontally extending support bar, said second generally horizontally extending support bar being positioned below said generally horizontally extending support bar and having a split portion which extends to said rear wheel means, and rearwardly extending support bar means extending from said tubular member of said frame means to said rear wheel means, said means supporting said tubular member comprising an upstanding support bar, said upstanding support bar, said split portion of said second generally horizontally extending support bar and said rearwardly extending support bar being connected to one another in a rigid, triangular configuration.

8. A recumbent cycle according to claim 1 wherein said rod member comprises a plurality of spaced apart apertures extending therethrough, wherein said tubular member comprises an aperture extending therethrough, wherein each of said spaced apart apertures in said rod member is capable of being aligned with said aperture in said tubular member, and wherein said means cooperative with said rod member and said tubular member comprises clip means having a portion extending through said aperture in said tubular member and one of said spaced apart apertures in said rod member.

9. A recumbent cycle according to claim 1 wherein said rod member extends from said back rest portion of said seat at a location near said top of said seat, and wherein said frame means comprises an upstanding support bar which extends above said generally horizontally extending support bar to said generally horizontally extending support bar.

10. A recumbent cycle according to claim 9 wherein said triangular configuration is approximately that of an equilateral triangle.

11. A recumbent cycle according to claim 1 wherein said rod member comprises a hand-operated, quick release latch mechanism for securing said rod member in a desired position with respect to said tubular member.

12. A recumbent cycle comprising;

front wheel means;

rear wheel means;

generally horizontally extending frame means extending between said front wheel means and said rear wheel means, said front wheel means being journaled in said frame means for oscillation about a generally vertically extending axis to permit steering of said recumbent cycle, said frame means comprising a generally horizontally extending support bar, a generally horizontally extending tubular member and means extending from said support bar for supporting said tubular member;

foot supporting means attached to said frame means;

a seat spaced from said foot supporting means and comprising a generally horizontally extending bottom portion, a generally vertically extending backrest portion, and downwardly facing C-shaped bracket means, said C-shaped bracket means being secured to said bottom portion and partly surrounding said generally horizontally extending support bar and being slidable therealong, said backrest portion having a generally horizontally extending rod member extending rearwardly therefrom, said rod member being slidably received in said tubular member;

means cooperative with said rod member and said tubular member for adjusting the position of said seat on said frame means between said front wheel means and said rear wheel means to adjust the spacing between said seat and said foot supporting means;

handle bar steering control means having opposed handles which are graspable by a person in said seat, said handle bar steering control means being spaced from said front wheel means and being journaled with respect to said frame means for oscillation about a generally vertically extending axis; and connecting rod means connecting said handle bar steering control means to said front wheel means for transmitting oscillating movement from said handle bar steering control means to said front wheel means.

13. A recumbent cycle according to claim 12 wherein said front wheel means comprises a single wheel, wherein said rear wheel means comprises a single wheel, wherein said foot supporting means comprises a rotatable pedal assembly, and further comprising sprocket and chain drive means for transmitting rotational movement from said pedal assembly to said rear wheel means.

14. A recumbent cycle according to claim 13 wherein said connecting rod means is tubular and further comprising;
brake means for applying braking force to said front wheel means comprising a caliper brake at said front wheel means, a brake operating lever at said handle bar steering control means, and a flexible cable extending at least partly through said connecting rod means from said brake operating lever to said caliper brake.

15. A recumbent cycle according to claim 12 wherein said sprocket and chain drive means comprises a multiple speed drive of the derailer type.

16. A recumbent cycle according to claim 12 wherein said rod member comprises a plurality of spaced apart apertures extending therethrough, wherein said tubular member comprises an aperture extending therethrough, wherein each of said spaced apart apertures in said rod member is capable of being aligned with said aperture in said tubular member, and wherein said means cooperative with said rod member and said tubular member comprises clip means having a portion extending through said aperture in said tubular member and one of said spaced apart apertures in said rod member.

17. A recumbent cycle according to claim 16 wherein said clip means comprises a hand removable, generally U-shaped clip, and wherein said portion of said clip means is a leg portion of said U-shaped clip.

18. A recumbent cycle according to claim 17 wherein said frame means comprises a second, generally horizontally extending support bar, said second generally horizontally extending support bar being positioned below said generally horizontally extending support bar and having a split portion which extends to said rear wheel means, and rearwardly extending support bar means extending from said tubular member of said frame means to said rear wheel means, said means supporting said tubular member comprising an upstanding support bar, said upstanding support bar, said split portion of said second generally horizontally extending support bar and said rearwardly extending support bar being connecting to one another in a rigid, triangular configuration.

19. A recumbent cycle according to claim 12 wherein said rod member extends from said back rest portion of said seat at a location near said top of said seat, and wherein said frame means comprises an upstanding support bar which extends above said generally horizontally extending support bar to said generally horizontally extending support bar.

20. A recumbent cycle according to claim 19 wherein said triangular configuration is approximately that of an equilateral triangle.

21. A recumbent cycle according to claim 12 wherein said rod member comprises a hand operated, quick release latch mechanism for securing said rod member in a desired position with respect to said tubular member.

22. A recumbent cycle according to claim 12 wherein said C-shaped bracket means comprises a part-cylindrical bracket with an opening which is smaller than the inside diameter of said part-cylindrical bracket, wherein said generally horizontally extending support bar is narrower than said opening, and further comprising:
a sleeve engaging a portion of said generally horizontally extending support bar, said sleeve being wider than said opening of said part-cylindrical bracket and no wider than said inside diameter of said part-cylindrical bracket, said part-cylindrical bracket surrounding and being supported by said sleeve and being slideable therealong.

23. A recumbent cycle according to claim 22 wherein said C-shaped bracket means further comprises a second part-cylindrical bracket spaced apart from said part-cylindrical bracket, said second part-cylindrical bracket being like said part-cylindrical bracket and surrounding and being supported by said sleeve and being slideable therealong.

24. A recumbent cycle according to claim 22 wherein said C-shaped bracket means further comprises a second part-cylindrical bracket spaced apart from said part-cylindrical bracket, said second part-cylindrical bracket being like said part-cylindrical bracket and surrounding and being supported by said sleeve and being slideable therealong.

25. A recumbent cycle according to claim 12 wherein said C-shaped bracket means comprises a part-cylindrical bracket with an opening which is smaller than the inside diameter of said part-cylindrical bracket, wherein said generally horizontally extending support bar is narrower than said opening, and further comprising:
a sleeve engaging a portion of said generally horizontally extending support bar, said sleeve being wider than said opening of said part-cylindrical bracket and no wider than said inside diameter of said part-cylindrical bracket, said part-cylindrical bracket surrounding and being supported by said sleeve and being slideable therealong.

* * * * *